Figure 1:
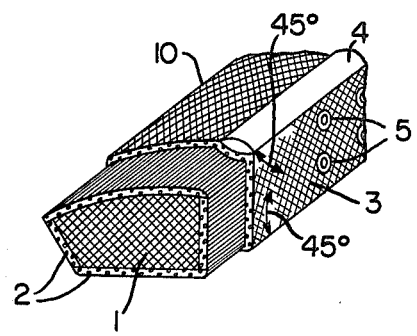

United States Patent [19]

Heissler et al.

[11] 4,155,305

[45] May 22, 1979

[54] BENDING-RESISTANT GRIPPER CARRIAGE FOR USE IN OFFSET PRINTING MACHINES, AND PROCESS FOR MANUFACTURE THEREOF

[75] Inventors: Herbert Heissler, Munich; Horst Wurtinger, Fürstenfeldbruck; Eberhard Willeitner, Utting am Ammersee, all of Fed. Rep. of Germany

[73] Assignee: Maschinenfabrik Augsburg-Nurnberg Aktiengesellschaft, Fed. Rep. of Germany

[21] Appl. No.: 770,020

[22] Filed: Feb. 18, 1977

[30] Foreign Application Priority Data

Feb. 18, 1976 [DE] Fed. Rep. of Germany ........ 2606347

[51] Int. Cl.² .............................................. B41F 21/04
[52] U.S. Cl. ...................................... 101/408; 29/118; 101/407 A; 101/409; 118/231; 156/172; 156/173; 271/224; 271/82
[58] Field of Search ................. 271/82, 277, 84, 204; 29/118, 131; 118/231; 101/407–411, 246; 156/161, 171, 172, 173, 175

[56] References Cited

U.S. PATENT DOCUMENTS

| 1,436,680 | 11/1922 | Smith | 101/409 |
|---|---|---|---|
| 2,622,000 | 12/1952 | Thompson | 29/118 |
| 2,794,240 | 6/1957 | Allen | 29/131 |
| 3,139,826 | 7/1964 | Rainwater | 29/129.5 |
| 3,429,758 | 2/1969 | Young | 156/173 |
| 3,470,051 | 9/1969 | Meyer | 156/171 |
| 3,652,376 | 3/1972 | Bowden | 101/407 A |
| 3,709,754 | 1/1973 | Medler | 156/161 |

FOREIGN PATENT DOCUMENTS

| 2140442 | 3/1972 | Fed. Rep. of Germany ...... 101/407 R |
|---|---|---|
| 248224 | 4/1947 | Switzerland ............................ 101/408 |

OTHER PUBLICATIONS

Bixby et al., Metal Surfaced Plastic Foam Core Printer Type Element, IBM Tech. Discl. Bulletin, vol. 18, No. 10, p. 3204, 3/76.

Primary Examiner—William Pieprz
Attorney, Agent, or Firm—Craig and Antonelli

[57] ABSTRACT

A bending-resistant gripper carriage structure is constructed in a fiber sandwich construction of the gripper carriage support. At least one layer of fibers is provided which may be in a shell-type mode with two layers of fibers each having different directions of elongation, one layer having fibers extending in the longitudinal direction of the gripper carriage support, and the other layer having fibers extending crosswise to the longitudinal direction. Several manufacturing techniques can be utilized such as fiber winding and/or lamination of fiber strips or tubes.

28 Claims, 2 Drawing Figures

U.S. Patent     May 22, 1979     4,155,305

BENDING-RESISTANT GRIPPER CARRIAGE FOR USE IN OFFSET PRINTING MACHINES, AND PROCESS FOR MANUFACTURE THEREOF

The invention relates to a bending-resistant gripper carriage, particularly for offset printing machines, and a process for manufacturing such bending-resistant gripper carriage structures, expecially for use as gripper carriages in offset printing machines. In particular, the present invention resides in a gripper carriage and process for manufacturing a gripper carriage for use in offset printing machines wherein the large bending and deformation forces occurring in offset printing are compensated.

Gripper devices in printing machines have been previously contemplated, for example, in U.S. Pat. Nos. 2,882,049; 2,436,765; 2,974,572; 604,004; 2,405,868; and 2,551,060; as well as German Offenlegungsschrift No. 2,140,442, in which the necessary portions are incorporated herein to show the state of the prior art. However, gripper carriages for offset printing machines are subject to rather great deformations with increasing printing speeds, thereby resulting in a mutual shifting of the dots which form the picture. The concomitant shifting of the color shade of the printed product is, of course, rather disadvantageous and undesirable.

The deformation of the gripper carriages occurring at higher printing speeds results from the centrifugal force which is a necessary result of the predetermined curves through which the carriage travels. During this travel, the gripper carriages are under the force of a load resulting from the product of its own weight times the acceleration of the carriage. As such, this load is a linear load.

In general, the equation of a bending curve for a gripper carriage support under linear load reveals that the flexure is smaller, when the expression $(E/\gamma) \cdot I_b$ is large. In this connection, $E/\gamma$ represents the specific modulus of elasticity, and $I_b$ represents the area moment of inertia.

These values can be influenced and varied by constructional techniques, such as considered in the concurrently filed U.S. patent application, Ser. No. 770,019, filed Feb. 18, 1977, having common inventors, and assigned to the same Assignee as the present invention.

The present invention resides in a solution to the problems arising in offset printing machines by providing a novel construction for bending-resistant gripper carriage structures, wherein the specific modulus of elasticity, as well as the area moment of inertia, are substantially increased without having to increase simultaneously the weight of such structures, thereby making it possible at the same time to obtain an increase in the printing speeds than are presently customary.

This problem is solved in accordance with the present invention by constructing the gripper carriage support, in order to increase its specific modulus of elasticity, with structural elements of a fiber sandwich structure; and further, in order to increase the area moment of inertia, the available cross-section of the gripper carriage support is optimally enhanced and utilized.

On the basis of a construction of gripper carriage structures in accordance with this invention, substantial advantages are attained in which extraordinarily favorable values are achieved for the specific modulus of elasticity and for the area moment of inertia of the gripper carriage; and further, the weight of such structural elements can be maintained at a relatively low value.

Such structures make possible, for example, to construct an extraordinarily bending-resistant gripper carriage support, wherein deformations can occur only to a very minor extent, even at relatively high printing speeds.

According to an advantageous further development of the invention, the fibers are arranged so that they lie in the direction of the normally occurring stresses.

Another, particularly advantageous embodiment of the invention results from the construction of the gripper carriage support in a shell-type mode from at least one layer of fiber with at least two fiber directions. Preferably, this layer proper covers or encompasses an appropriate core.

According to a preferred additional embodiment of the invention, the layer providing the shell-type construction contains fibers extending in parallel to the longitudinal axis of the gripper carriage support.

Furthermore, a particularly advantageous construction occurs by providing a layer with fibers lying in crosswise plies. In this connection, the fiber directions in the layer may extend within an angular range of $\pm 30°$ to $\pm 60°$ of the longitudinal axis of the gripper carriage support. Preferred fiber directions of these crosswise fiber plies may be at $\pm 45°$ to the longitudinal direction.

According to a further embodiment of this invention, the core encompassed by the layer can consist of a synthetic resin, for example of hard foam. However, there the use of a metal core, for example, a sheet-metal component, is also advantageous in this construction.

Another advantageous embodiment of the present invention resides in making the layers resulting in the shell-type construction of carbon fibers/synthetic resin. However, other suitable fiber materials may be boron fibers, "ARANID" fibers, special glass fibers, or metallic filaments, such as, for example, beryllium filaments.

In accordance with a further development of the present invention, one or more tie rods can be incorporated into the gripper carriage support, whereby it is possible to pre-tension or pre-stress the gripper carriage support against flexure during operation. Such a tie rod may be constituted particularly by a metal wire or by a metal cable.

According to another embodiment of the invention, the gripper carriage support has a previously produced or pre-set curvature fixed in correspondence with the bending line of the carriage which occurs during operation. Finally, provision may also be made for inserting mounting elements in the form of inserts, plates with threads, or the like, in the core encompassed by the layer or layers, so as to be able to introduce a force or stress into these layers, for example, from attachments to the gripper carriage structure, such as especially from impact strips, from bearing blocks, or the like.

Furthermore, end plates are advantageously arranged in opposing correspondence to the narrow end faces of the gripper carriage support. These end plates can be attached to the gripper carriage support, for example, by cementing or gluing, and/or jointing or splicing.

According to a still further embodiment of the present invention, bearing blocks receiving a gripper shaft are mounted along an outer longitudinal side of the gripper carriage support.

The process for the manufacture of such bending-resistant gripper carriage structures resides, according to the present invention, in gluing a layer of fibers in purely longitudinal plies on an appropriately shaped core, and then surrounding this layer by a further layer constituted of crosswise fiber plies.

For surrounding the inner layer with the outer layer of crosswise fiber plies, it is possible to employ either a fiber winding method or a laminating method. In the latter case, it is possible to use either fiber strips or fiber hoses or tubes. There is, however, the further possiblity of utilizing semifinished materials as the composite fiber materials for the layers.

In accordance with a further embodiment of the manufacturing process of this invention, a core constituted of a synthetic resin or a metal is utilized, which core remains, after the manufacturing process, within the gripper carriage support produced by the shell-type construction method. There exists the possibility of applying the composite fiber materials to a core which can be removed after the manufacturing process.

Figure 2:
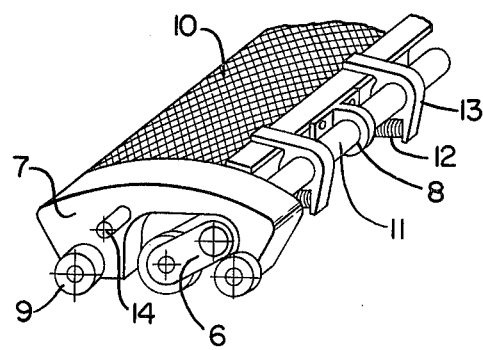

These and other objects, features, and advantages of the present invention will become more apparent from the following description when taken in connection with the accompanying drawing which shows, for purposes of illustration only, an embodiment in accordance with the present invention, and wherein:

FIG. 1 shows a gripper carriage support in a perspective partial cross-sectional view, and FIG. 2 shows a perspective end view of a gripper carriage with a gripper carriage support according to FIG. 1.

The construction of a gripper carriage support according to the present invention is illustrated in FIG. 1 for a shell-type mode denoted by 10. In this construction, a layer 2 preferably containing carbon fibers is glued to a hard-foam core 1, and entirely surrounds the latter, although shown in partial section in FIG. 1.

The fibers of the layer 2 form purely longitudinal plies, i.e. they extend in parallel to the longitudinal axis of the gripper carriage support 10, which is the direction of the normal stresses. In order to absorb shear stresses, the layer 2 is surrounded by crosswise fiber windings, for example, with fibers being at an angle of ±45° to the longitudinal direction, thus obtaining a further layer 3 encompassing or covering the layer 2. The crosswise fiber windings may also be ±30° to ±60° with respect to the longitudinal direction. Layer 3 also preferably is constituted of carbon fibers, although both fiber layers 2 and 3 may be constituted of fibers of a synthetic resin.

The thus-produced gripper carriage support 10 is furthermore provided on its topside with an impact strip 4.

Inserts 5 may be further included within the hard-foam core 1 for attaching various kinds of accessory components; however, such inserts can also be replaced by threaded plates, or like elements. Accessory components may be, for example, the above-mentioned impact strip 4 or bearing blocks 8, such as shown in FIG. 2. The inclusion of the inserts, or the like, is effected by a pressure-based connection so that force introduction is provided in the layers 2 and 3 from the accessory components.

In place of a core 1 consisting of hard foam, it is also possible to employ a lightweight sheet-metal core.

Moreover, bearing blocks 8, as seen in FIG. 2, are mounted respectively on the outside along a longitudinal side of the gripper carriage support 10. These bearing blocks contain the bearings for a gripper shaft 11. Brackets 13 are attached to this gripper shaft 11 and each cooperate with springs 12. The curved upper ends of the brackets 13 rest on the impact strip 4.

Furthermore, the gripper carriage support 10 has at its end faces in each instance end plates 7 which can be attached by gluing and/or jointing to the gripper carriage support 10. These end plates 7 serve particularly for mounting drag levers 6, trunions 14, and guide rollers 9, provided to accommodate guiding and transporting by the rotating gripper carriage.

Finally, the bearing blocks 8 for the gripper shaft 11 may be releasably connected in each case with the gripper carriage support 10 by means of the inserts or elements 5, thereby enhancing assembly, adjusting, and ease of repair.

Because of the construction of gripper carriage structures in accordance with this invention, these structures have great bending resistance, and the gripper carriages can withstand higher centrifugal forces without suffering undue deformation than previously contemplated. This makes it possible in particular to utilize higher printing speeds.

The manufacture of the gripper carriage support in accordance with the present invention may be carried out by fixing the layer 2 to the core 1, as mentioned above, for example, by gluing. Thereafter, the layer 3 may be applied over the layer 2 by conventional winding techniques using the core 1 and layer 2 as a mandrel wherein the winding is carried out in accordance with the present invention crosswise or angularly to the longitudinal direction. Alternatively, within the scope of the present invention, the layer 3 may be constituted as either a fiber strip or tube of fiber material, each having a crosswise orientation of the fibers, which is then laminated by conventional lamination techniques to the layer 2. In the case of the fiber tube, for example, the core 1 and layer 2 may be inserted within the tube before carrying out the lamination.

As noted above, the present invention provides a significantly improved, practical, and efficient gripper carriage structure, particularly for use in high speed operation with offset printing machines. As such, the gripper carriage structure may be connected to an endless chain of the offset printing machine, and serves as a means to transport sheets to be printed on from one printing roller to another printing roller, or to another gripper carriage which coneys the sheet to a subsequent printing roller. In addition, such gripper carriage structures may be used to convey sheets from a table to the first station of the machine, or from the last station to a storage device. Further, the structure of the gripper carriage of the present invention may be used for conveying sheets to and from shear presses for cutting the sheets to size.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What we claim is:

1. A bending-resistant gripper carriage arrangement for offset printing machines which comprises a gripper bar of bonded fiber construction having a continuous, smooth, curved upper outer sheet receiving surface, a gripper shaft supported by said gripper bar and gripping brackets carried by said gripper shaft for movement between sheet gripping and sheet releasing positions, said gripping brackets gripping a sheet between said brackets and said upper outer sheet receiving surface of the gripper bar in said sheet gripping position.

2. Gripper carriage arrangement according to claim 1, wherein said fiber construction comprises a layer of fibers, all of which extend parallel to the longitudinal axis of the gripper bar and substantially thereacross.

3. Gripper carriage arrangement according to claim 1, wherein the bonded fiber construction of the gripper bar is made of at least one layer formed of fibers extending in at least two fiber directions.

4. Gripper carriage arrangement according to claim 3, wherein said at least one layer encloses a core.

5. Gripper carriage arrangement according to claim 4, wherein the core is made of a synthetic resin.

6. Gripper carriage arrangement according to claim 4, wherein the core is made of metal.

7. Gripper carriage arrangement according to claim 4, comprising fixing element means for supporting said gripper bar components which are incorporated into the core and fittings which are secured to the gripper bar.

8. Gripper carriage arrangement according to claim 7, wherein the fixing element means are constituted by inserts to which the gripper bar is attached.

9. Gripper carriage arrangement according to claim 7, wherein the fixing element means are constituted by screwthreaded plates.

10. Gripper carriage arrangement according to claim 7, wherein the fittings are constituted by an impact strip disposed on said sheet receiving surface of the gripper bar.

11. Gripper carriage arrangement according to claim 7, wherein the fixing element is constituted by bearing block means which are attached along an outer longitudinal side of the gripper bar to support said gripper shaft for rotary movement about its axis.

12. Gripper carriage arrangement according to claim 3, wherein the layer contains fiber extending parallel to the longitudinal axis of the gripper bar.

13. Gripper carriage arrangement according to claim 3, wherein the layer has crosswise fiber plies.

14. Gripper carriage arrangement according to claim 13, wherein the directions of the fibers in the layer extend within an angular range of ±30° to ±60° relative to the longitudinal axis of the gripper bar.

15. Gripper carriage arrangement according to claim 13, wherein the layer consists of carbon fibers impregnated with synthetic resin.

16. Gripper carriage arrangement according to claim 1, wherein at least one tie rod means is incorporated into the gripper bar, the gripper bar being stressed by the tie rod means to counteract a bending load acting on the gripper bar when the gripper bar is in use.

17. Gripper carriage arrangement according to claim 16, wherein the tie rod means is constituted by a metal wire.

18. Gripper carriage arrangement according to claim 16, wherein the tie rod means is constituted by a metal cable.

19. Gripper carriage arrangement according to claim 1, wherein end plate means are respectively arranged in opposition to the end faces of the gripper bar.

20. A process for manufacturing bending-resistant gripper bars for gripper carriages in offset printing machines, comprising the steps of forming a core in the shape of a bar, applying a first layer of fibers onto the core and applying a second layer of fibers onto the first layer of fibers wherein the fibers of the first layer extend parallel to the longitudinal axis of the core and wherein the fibers of the second layer are arranged crosswise.

21. Process according to claim 20, wherein the first layer of fibers is applied to the core by glueing the fibers onto the core.

22. Process according to claim 20, wherein the second layer of fibers is applied to the first layer by winding the fibers of the second layer round the composite core and first layer.

23. Process according to claim 20, wherein the second layer of fibers is applied to the composite core and first layer by lamination, wherein the fibers of the second layer are in the form of strips.

24. Process according to claim 20, wherein the second layer of fibers is applied to the composite core and first layer by lamination, wherein the fibers of the second layer are in the form of hoses.

25. Process according to claim 20, wherein said core remains within the bar that is produced by that method.

26. Process according to claim 20, wherein said core is removed after the manufacturing procedure.

27. Process according to claim 20, wherein the core is made of synthetic resin.

28. Process according to claim 20, wherein the core is made of metal.

* * * * *